United States Patent [19]

Iwasaki

[11] Patent Number: 4,786,270
[45] Date of Patent: Nov. 22, 1988

[54] HOMOKINETIC TRIPOD JOINT

[75] Inventor: Keiji Iwasaki, Yokohama, Japan

[73] Assignee: NTN Toyo Bearing Co., Ltd., Osaka, Japan

[21] Appl. No.: 46,322

[22] Filed: May 6, 1987

[30] Foreign Application Priority Data

Sep. 17, 1986 [JP] Japan .................. 61-142402[U]
Jan. 31, 1987 [JP] Japan ..................... 62-21613

[51] Int. Cl.$^4$ ............................................. F16D 3/20
[52] U.S. Cl. ................................... 464/111; 464/124; 464/132; 464/905
[58] Field of Search ............... 464/111, 122, 123, 124, 464/132, 905

[56] References Cited

U.S. PATENT DOCUMENTS

| 3,818,721 | 6/1974 | Wahlmark | 464/111 |
| 4,091,641 | 5/1978 | Welschof | 464/905 X |
| 4,684,356 | 8/1987 | Kimata et al. | 464/111 |

FOREIGN PATENT DOCUMENTS

| 2748044 | 5/1978 | Fed. Rep. of Germany | 464/111 |
| 132046 | 10/1979 | Japan | 464/111 |
| 40016 | 3/1984 | Japan | 464/111 |

Primary Examiner—Daniel P. Stodola
Attorney, Agent, or Firm—Armstrong, Nikaido, Marmelstein & Kubovcik

[57] ABSTRACT

A homokinetic tripod type universal joint including a tripod member having three trunnions, with a roller rotatably mounted on each trunnion is mounted in an outer member. The roller consists of an inside ring and an outside ring wherein contact is established between a spherical outer periphery of the inside ring and a cylindrical inner periphery of the outside ring. The outside ring is guided in a direction parallel with the axis of the outer member by guide surfaces provided internally of grooves formed on the outer member. This arrangement helps to reduce sliding resistance, temperature rise and vibrations due to induced thrust.

4 Claims, 3 Drawing Sheets

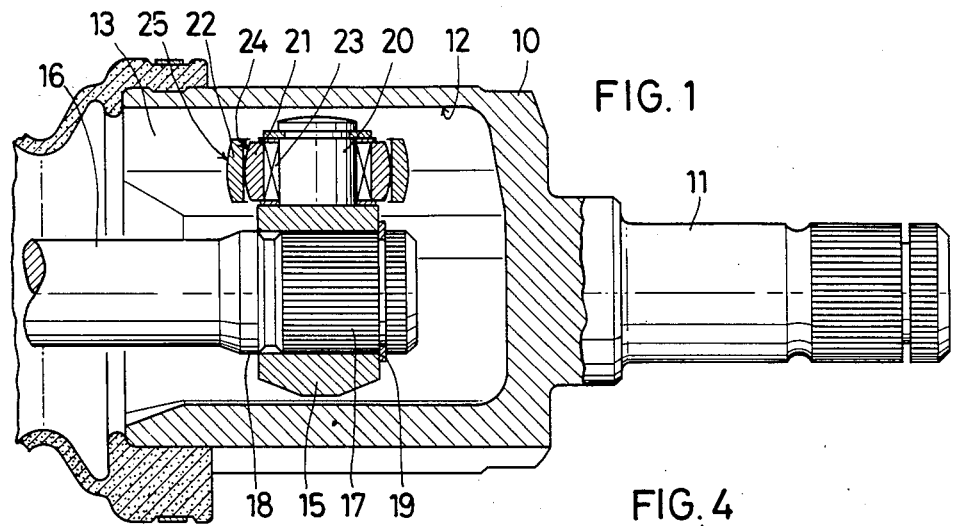
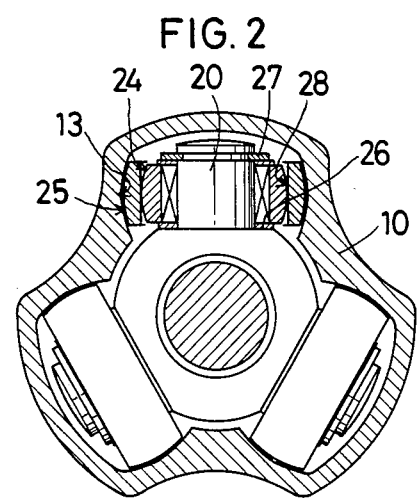
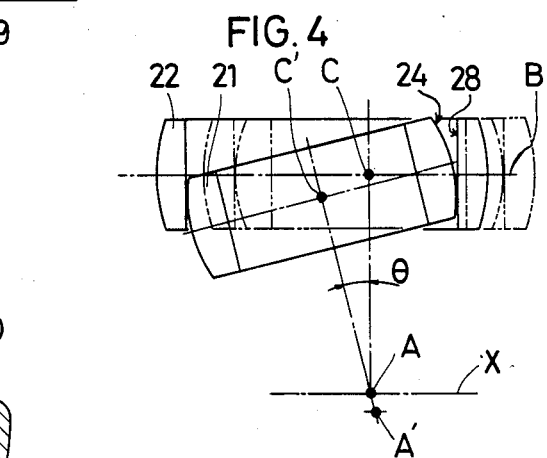
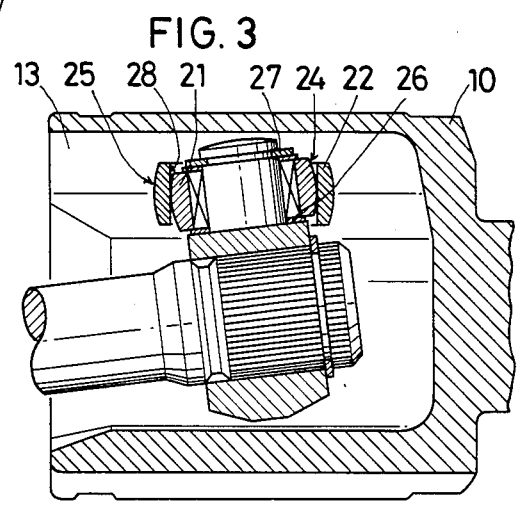

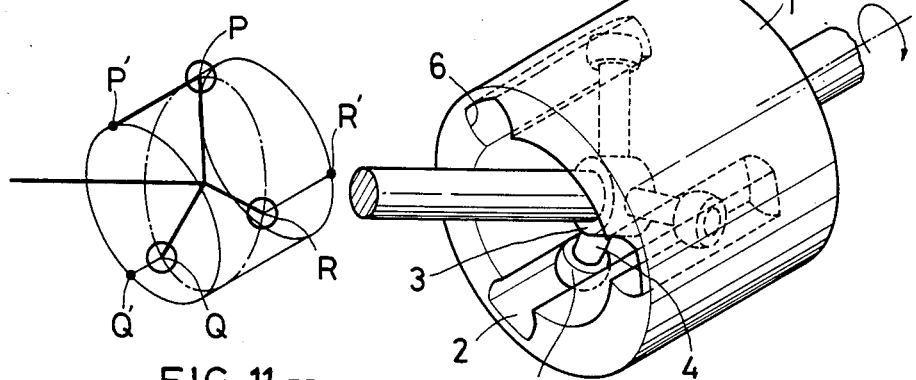
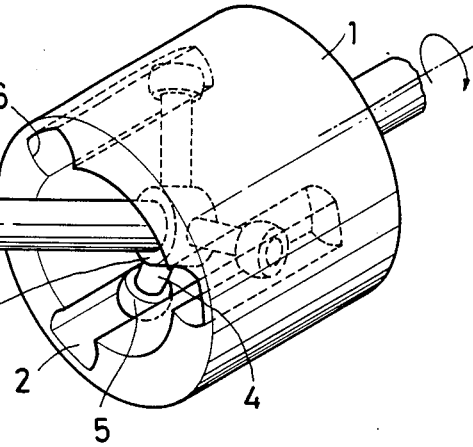
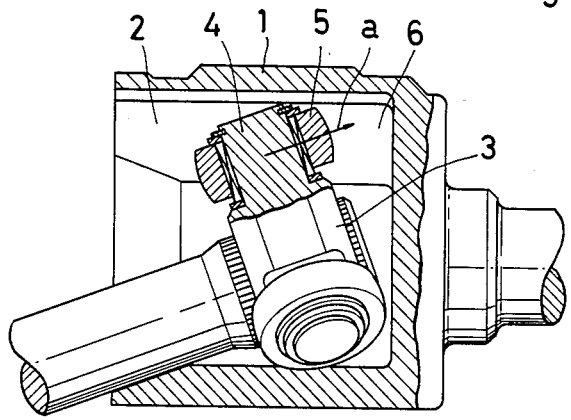
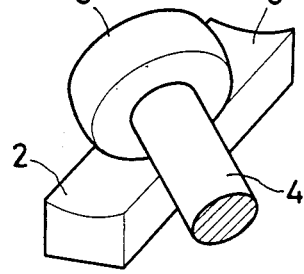
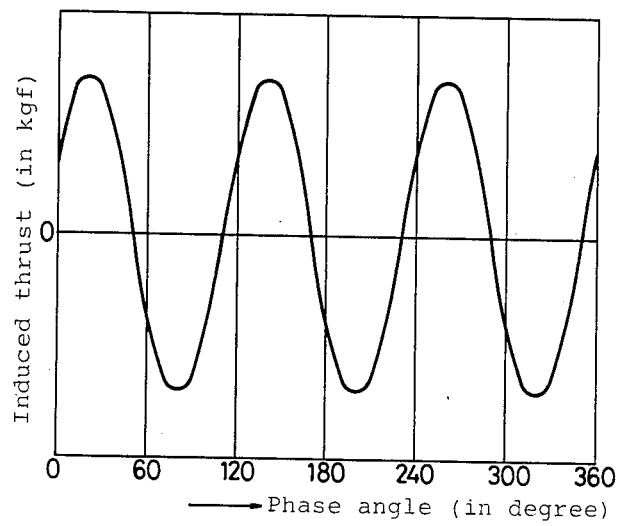

HOMOKINETIC TRIPOD JOINT

The present invention relates to a homokinetic universal joint used mainly for front wheel drive vehicles, and particularly to a tripod type homokinetic universal joint.

As a conventional universal joint of this type, the one shown in FIG. 11 is known which comprises an outer member 1 formed in its internal surface with three cylindrical track grooves 2 extending axially, a tripod member 3 mounted in the outer member 1 and provided with three trunnions 4 radially extending, and spherical rollers 5 rotatably and axially slidably mounted on the trunnions 4. Each spherical roller 5 is adapted to engage guide surfaces 6 formed on both sides of the track groove 2.

On a homokinetic universal joint of this type, when transmitting the rotation with the outer member 1 forming a working angle with respect to the tripod member 3, each spherical roller 5 plunges obliquely with respect to the guide surface 6 on the cylindrical track groove 2 as shown in FIGS. 11 and 12, so that a normal rolling movement of the spherical roller 5 is hindered.

Namely, although each spherical roller 5 tends to roll in the direction shown by arrow (a) in FIG. 11, it is forced to move along each track groove 2 which is cylindrical and parallel with the axis of the outer ring 1. As a result, slip can occur between the guide surfaces 6 on the track grooves 2 and the spherical rollers 5, causing temperature rise and a thrust which invites vibrations.

FIG. 13 is a graph showing the relationship between the phase angle of joint and the induced thrust.

The mechanics of the induced thrust being produced will be described below with reference to FIGS. 9 and 10, which show how the members are positioned when transmitting the rotation with the outer member 1 forming a working angle with respect to the tripod member 3.

When the joint rotates, the spherical rollers 5 mounted on the trunnions 4 of the tripod member 3 reciprocate in the axial direction of the outer member 1 along the guide surfaces 6 on the outer member 1. As shown in FIG. 9, three spherical rollers 5 make a slidal movement from point P to P', Q to Q' and R to R', respectively, and then move back to the original position, making one round trip on each guide surface 6 per rotation of the joint. The contact force acting between the guide surfaces 6 and the spherical rollers 5 induces a thrust.

The direction and intensity of the thrust produced by each spherical roller 5 vary with the phase of rotation. As shown in FIG. 10, two of three spherical rollers 5 are pulled to the lefthand side of the outer member 1 and the other one is pulled to its righthand side, so that a thrust is induced.

As shown in FIG. 13, the sum of the thrust produced by three spherical rollers 5 changes periodically from positive to negative and vice versa three times per rotation of the joint. The amplitude is so large as to cause various problems about vibrations on vehicles.

An object of the present invention is to provide a tripod type homokinetic universal joint which obviates the abovesaid shortcomings and which reduces the induced thrust, thus eliminating the problems relating to vibrations.

In accordance with the present invention, the roller mounted on each trunnion comprises an inside ring and an outside ring, the inside ring having a spherical outer periphery and the outside ring having a cylindrical inner periphery. The inside ring is in contact with the outside ring between the spherical outer periphery of the former and the cylindrical inner periphery of the latter, the outside ring having outer periphery guided in a direction parallel with the axis of the outer member by the roller guide surface formed on the outer member.

The homokinetic universal joint in accordance with the present invention has the following advantages:

(a) Since the outside ring rolls smoothly along the guide surfaces formed on the track groove in a direction parallel to the axis of the outer ring, the resistance to slip is small and temperature rise as well as vibrations resulting from an induced thrust can be reduced.

(b) Since the outside ring and the inside ring are in contact with each other between the cylindrical inner periphery of the former and the spherical outer periphery of the latter, the relative movements between these rings and the operation of the joint with a certain working angle are smooth and friction and temperature rise are small in the joint.

(c) Since the inside and outside rings have simple shapes, they are very easy and inexpensive to machine.

Other features and objects of the present invention will become apparent from the following description taken with reference to the accompanying drawings, in which:

FIG. 1 is a vertical sectional side view of the first embodiment of a homokinetic universal joint in accordance with the present invention;

FIG. 2 is a transverse sectional view of the same;

FIG. 3 is a vertical sectional view of the same with a certain working angle;

FIG. 4 is a schematic view showing how the inside ring moves with respect to the outside ring;

FIG. 9 is a schematic view showing how a conventional joint moves;

FIG. 10 is a perspective view of a conventional joint which is schematically shown in FIG. 9;

FIG. 11 is a vertical sectional side view of a conventional joint;

FIG. 12 is a perspective view showing how the spherical roller rolls on the conventional joint; and FIG. 13 is a graph showing the relationship between the induced thrust and the phase angle of each trunnion.

Figure 5:
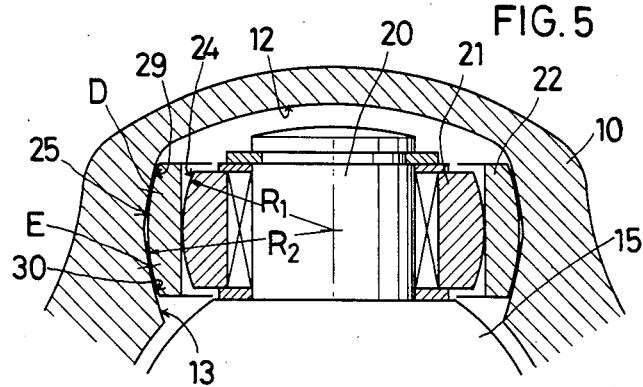
FIG. 5 is a partial enlarged transverse sectional view of the first embodiment.

FIGS. 1 through 5 show the first embodiment of the present invention. An outer member 10 is integrally provided with a first shaft 11 at its closed end and formed with three axial track grooves 12 in its internal surface arranged at equal angular intervals of 120 degrees, as in a conventional homokinetic joint. Each track groove 12 has at each side a roller guide surface 13.

A tripod member 15 mounted in the outer member 10 engages a serration 17 formed on one end of a second shaft 16 and is held between a stepped portion 18 and a clip 19 so as not to slip off. The tripod member 15 is provided with three trunnions 20 on each of which a roller comprising an inside ring 21 and an outside ring 22 is rotatably mounted.

Each inside ring 21 is mounted on the trunnion 20 through rolling elements 23 and is held between a shoulder 26 of the tripod member 15 and a clip 27 so as not to move in the axial direction of the trunnion 20. The outside ring 22 is mounted on a spherical outer periphery 24 of the inside ring 21, and is formed with a spherical outer periphery 25, which is guided by the roller guide surfaces 13. The inside ring 21 engages the outside ring 22 through the contact between the spherical outer periphery 24 of the former and a cylindrical inner periphery 28 of the latter.

FIG. 3 shows the first embodiment with a certain working angle. The inside ring 21 is inclined with respect to the outside ring 22, moving along the cylindrical inner periphery 28 of the outside ring 22. The outside ring 22 rolls smoothly along the guide surfaces 13 on the outer member 10 in a direction parallel with the axis of the outer member 10. Thus the resistance to slip decreases.

FIG. 4 shows how the inside ring 21 moves with respect to the outside ring 22. The center A of the tripod member 15 is on the axis X of the outer member 10 with no working angle. The center line of the outside ring 22 as well as the center C of the inside ring 21 are on the center line B of the roller guide surface 13. When the shafts form a working angle $\theta$, the center of the tripod member 15 shifts from A to A' which is below the axis X. Thus, the inside ring 21 is inclined with respect to the outside ring 22, and the center of the inside ring 21 shifts from the point C to the point C' which is below the center of the outside ring 22. Since the spherical outer periphery 24 of the inside ring 21 rolls down the cylindrical inner periphery 28 of the outside ring 22, the movement of the inside ring with respect to the outside ring is very smooth.

FIG. 5 is a cross-sectional view showing how the roller guide surface 13, the outside ring 22 and the inside ring 21 are in contact with one another. Both of the centers of the curvature radii $R_1$ and $R_2$ of the spherical outer peripheries 24 and 25 of the inside ring 21 and the outside ring 22, respectively, are on the axis of the trunnion 20. The guide surface 13 formed on the outer member 10 comprises two cylindrical surfaces 29 and 30 both having larger radii of curvature than the radius of curvature $R_2$ of the spherical outer periphery 25 of the outside ring 22. Its spherical outer periphery 25 is in angular contact with the guide surface 13 at two points D and E. On account of the angular contact, the outside ring 22 is guided in a direction parallel to the axis of the outer member 10. The central portion of the guide surface 13 serves as a grease sump.

Figure 6:
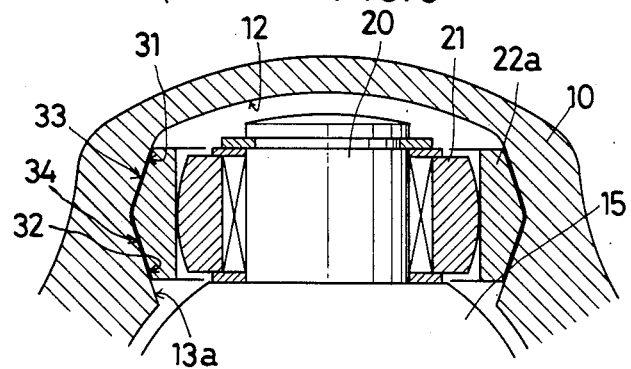
FIG. 6 is a similar view of the second embodiment.

FIG. 6 shows the second embodiment. Its construction is the same as that of the first embodiment except for the shape of a guide surface 13a and that of the outer periphery of the outside ring 22a.

The roller guide surface 13a comprises two planes 31 and 32 forming an angle with each other. The outer periphery of the outside ring 22a is in the shape of two conical surfaces 33 and 34 so as to conform to the shape of the guide surface 13a. The outside ring 22a is guided in a direction parallel with the axis of the outer member 10 by the contact between two planes 31 and 32 of the guide surface 13a and two conical surfaces 33 and 34 of the outside ring 22a. Although in this embodiment the outside ring is convex in section and the roller guide surface is concave, the reverse to this is possible.

Figure 7:
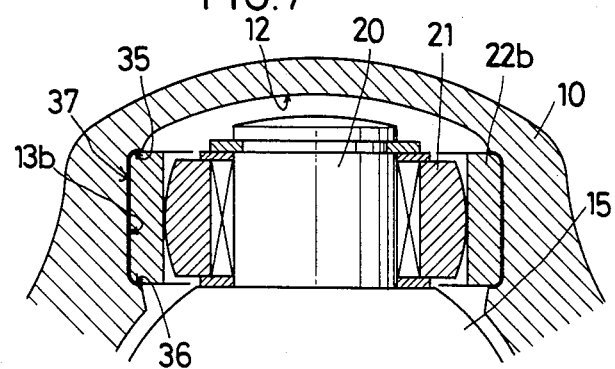
FIG. 7 is a similar view of the third embodiment.

FIG. 7 shows the third embodiment, which is different from the first one only in the shape of a guide surface 13b and the outer periphery of an outside ring 22b.

The guide surface 13b is a plane formed with shoulders 35 and 36 at both ends. An outer periphery 37 of the outside ring 22b is cylindrical in shape and its end portions are guided by the shoulders 35 and 36 in a direction parallel to the axis of the outer member 10.

Figure 8:
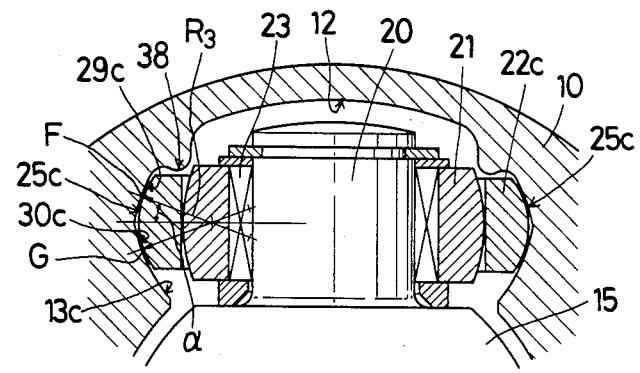
FIG. 8 is a similar view of the fourth embodiment.

FIG. 8 shows the fourth embodiment in which an outer periphery 25c of an outside ring 22c is spherical as in the first embodiment. Its radius of curvature $R_3$, which is smaller than the radius of curvature $R_2$ of the outside ring in the first embodiment, is set at about 40 per cent of the distance between the center of the trunnion 20 and the roller guide surface 13c.

The guide surface 13c has a section in the shape of a gothic arch consisting of two cylindrical surfaces 29c and 30c both having larger radii of curvature than the radius of curvature $R_3$. The spherical outer periphery 25c of the outside ring 22c is in angular contact with the roller guide surface 13c at two points F and G at a contact angle of about 20 degrees.

The width of the outside ring 22c is smaller than that of the inside ring 21 in order to make the outer diameter of the outer member 10 smaller than those in the other embodiments.

A shoulder 38 protruding along the outside ring 22c is formed at the corner of the roller guide surface 13c on the side of the track groove 12 in order to restrict the deflection of the outside ring 22c to a minimum.

The outside rings 22a, 22b and 22c of the embodiments shown by FIGS. 6-8 are guided more securely in the groove 12 than the outside ring 22 in the embodiment of FIG. 5.

What are claimed are:

1. A homokinetic tripod joint comprising:
    an outer member formed in its inner surface with three track grooves extending axially and equally angularly spaced around its axis, each of said track grooves being formed at each side thereof with a guide surface extending in the direction of the axis of said outer member;
    a tripod member having three trunnions projecting radially and equally angularly spaced around its axis, said tripod member being mounted in said outer member with said trunnions received in said respective track grooves in said outer member;
    an inside ring mounted on each said trunnion and having a spherical outer periphery;
    a plurality of rolling elements mounted between said trunnion and said inside ring;
    an outside ring mounted on said inside ring and guided by a guide surface of said respective track groove and having an outer periphery in contact with said guide surface and a cylindrical inner periphery; and
    means for preventing said inside ring from sliding axially on said trunnion;
    said inside ring and said outside ring rolling around said trunnion in contact with each other between said spherical outer periphery of said inside ring and said cylindrical inner periphery of said outside ring with said outside ring being guided by said guide surface formed on said outer member in a direction parallel with the axis of said outer member.

2. A homokinetic tripod joint as claimed in claim 1, wherein said guide surface comprises two planes forming an angle with each other and the outer periphery of said outside ring comprises two conical surfaces conforming to the shape of said roller guide surface.

3. A homokinetic tripod joint as claimed in claim 1, wherein said guide surface comprises a plane formed with two shoulders at both ends and said outside ring has a cylindrical outer periphery.

4. A homokinetic tripod joint as claimed in claim 1, wherein said guide surface has a section in the shape of a gothic arch consisting of two cylindrical surfaces and said outside ring has a spherical outer periphery in angular contact with said roller guide surface at two points.

* * * * *